(12) United States Patent
Balas

(10) Patent No.: US 6,657,332 B2
(45) Date of Patent: Dec. 2, 2003

(54) TURBOGENERATOR COOLING SYSTEM

(75) Inventor: Francois Balas, Thousand Oaks, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/984,501

(22) Filed: Oct. 30, 2001

(65) Prior Publication Data

US 2002/0084702 A1 Jul. 4, 2002

Related U.S. Application Data

(60) Provisional application No. 60/244,398, filed on Oct. 30, 2000.

(51) Int. Cl.[7] .................................................. H02K 9/00
(52) U.S. Cl. ......................... 310/58; 310/62; 310/60 A; 310/64
(58) Field of Search .............................. 310/52, 57, 58, 310/59, 60 R, 62, 63, 64, 60 A, 254, 258

(56) References Cited

U.S. PATENT DOCUMENTS

| | | | |
|---|---|---|---|
| 771,468 A | 10/1904 | Falk ............................ | 310/57 |
| 2,752,515 A | 6/1956 | Baudry et al. ................. | 310/55 |
| 3,047,544 A * | 7/1962 | Byrd ........................... | 310/105 |
| 3,073,976 A | 1/1963 | Wesolowski .................. | 310/59 |
| 3,610,975 A | 10/1971 | Onjanow ...................... | 310/57 |
| 3,643,119 A | 2/1972 | Lukens ....................... | 310/60 R |
| 4,531,357 A | 7/1985 | Weber et al. ................... | 310/57 |
| 4,534,686 A * | 8/1985 | Nakamura et al. ........... | 409/135 |
| 4,553,055 A | 11/1985 | Auernhammer .............. | 310/62 |
| 4,839,547 A * | 6/1989 | Lordo et al. ............... | 310/60 A |
| 4,961,016 A | 10/1990 | Peng et al. .................... | 310/62 |
| 5,557,153 A | 9/1996 | Zimmermann ................ | 310/56 |
| 5,568,023 A | 10/1996 | Grayer et al. ................ | 318/139 |
| 5,894,178 A | 4/1999 | Stefan .......................... | 310/61 |
| 5,925,947 A | 7/1999 | Kajiwara et al. .............. | 310/64 |

* cited by examiner

Primary Examiner—Dang Le
(74) Attorney, Agent, or Firm—Pillsbury Winthrop LLP

(57) ABSTRACT

A turbogenerator cooling system is disclosed that has a cylindrical heat sink with generally axially extending fins on both the outside and inside of a hoop section. The hoop section is solid except for holes adjacent to the rear end thereof. The generator stator is press-fitted into the heat sink in contact with the internal fins. The generator rotor is fitted with a small fan for directing heated air away from the inlet of the engine. Cooling air passes along the external fins to the rear of the generator, flows through the holes in the hoop section passes forward between the inside of the hoop section and the external surface of the stator to cool the stator and along an alternate path to cool the rotor hollow sleeve and permanent magnetic shafts as well as the stator.

6 Claims, 8 Drawing Sheets

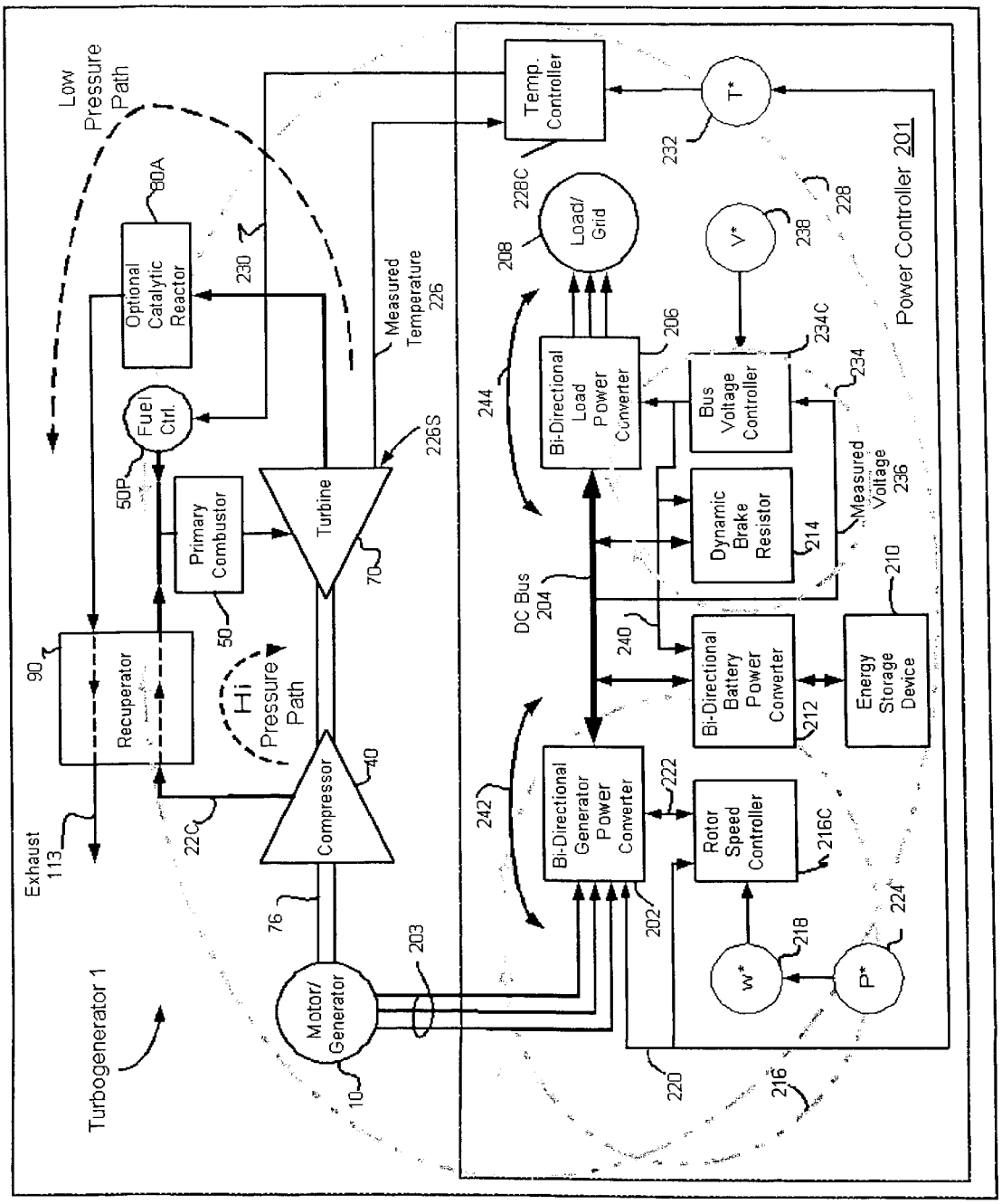

TURBOGENERATOR COOLING SYSTEM

REFERENCE TO RELATED APPLICATION

This application claims the benefit of priority under 35 USC 119(e) of U.S. Provisional Application No. 60/244,398, filed Oct. 30, 2000, which provisional application is incorporated by reference herein in its entirety.

TECHNICAL FIELD

This application relates to the general field of turbine generators and, more particularly, a cooling system therefor.

BACKGROUND OF THE INVENTION

The generators used in turbogenerator systems usually employ rotors comprising rare earth magnet shafts rotating at very high speed, on the order of 20,000 rpm to 100,000 rpm, within a generator stator. The stator comprises copper windings. Due to the high strength of the magnets and high operating speed, the generators are able to produce very high output power densities (defined as the ratio of power output to generator volume). The inventor recognized that, associated with the power density is a large amount of heating of both the generator stator and the rotor, and that this heat can damage the generator windings and demagnetize the rotor if it is not effectively removed from the generator.

The inventor recognized the disadvantage of fluid cooling generators is that it does not cool the generator rotor shaft, is fairly complex, requiring a circulating pump and a radiator, and it also has the potential to leak fluid and cause damage to the system.

Air-cooled systems have also been used successfully. In one such system the generator stator is pressed into a finned housing. Engine inlet air is then sucked over the fins, thus removing heat from the generator, but directing the heated air into the engine inlet.

SUMMARY OF THE INVENTION

In a first aspect, the present invention provides a turbogenerator cooling system, comprising:

(a) a turbogenerator inlet;
(b) a hood section having a front end, a rear end adjacent said turbogenerator inlet, a substantially cylindrical outer surface extending from said front end to said rear end, a substantially cylindrical inner surface extending from said front end to said rear end, and holes adjacent said rear end extending through said hood section;
(b) external fins extending generally axially from front to rear along said outer cylindrical surface of said hood section;
(c) a shroud enclosing said hood section and said external fins;
(d) internal fins extending generally from front to rear along said inner cylindrical surface of said hood section;
(e) a stator press-fit within said hood section in contact with said internal fins;
(f) a permanent magnet rotor shaft rotatably mounted within said stator; and
(g) a fan mounted on said permanent magnet rotor shaft for rotation therewith arranged to draw cooling air (1) rearwardly along said external fins between said hood section and said shroud, (2) inwardly through said holes adjacent the rear end of said hood section, and (3) forwardly away from said turbogenerator inlet along said internal fins between said hood section and said stator.

In another aspect, the invention provides a method of making a turbogenerator cooling system, comprising the steps of:

(a) providing a turbogenerator inlet;
(b) providing a hood section having a front end, a rear end adjacent said turbogenerator inlet, a substantially cylindrical outer surface extending from said front end to said rear end, a substantially cylindrical inner surface extending from said front end to said rear end, and holes adjacent said rear end extending through said hood section;
(b) providing external fins extending generally axially from front to rear along said outer cylindrical surface of said hood section;
(c) providing a shroud enclosing said hood section and said external fins;
(d) providing internal fins extending generally from front to rear along said inner cylindrical surface of said hood section;
(e) press-fitting a stator within said hood section in contact with said internal fins;
(f) mounting a permanent magnet rotor shaft rotatably within said stator; and
(g) mounting a fan on said permanent magnet rotor shaft for rotation therewith arranged for drawing cooling air (1) rearwardly along said external fins between said hood section and said shroud, (2) inwardly through said holes adjacent the rear end of said hood section, and (3) forwardly away from said turbogenerator inlet along said internal fins between said hood section and said stator.

The turbogenerator system cooling system of the present invention comprises a cylindrical heat sink with generally axially extending fins on both the outside and the inside of a hoop section. The hoop section is solid except for holes adjacent the rear end thereof through which cooling air passes to the inside of the hoop section. The generator stator is press-fit into the heat sink with its external surface in contact with the internal fins. The entire assembly is shrouded by a close-fitting cylindrical shroud. The generator rotor is fitted with a small fan for directing the heated air away from the inlet of the engine.

When the turbogenerator rotates, air enters the heat sink at the front of the generator between the hoop section and the shroud and passes along the external fins to the rear of the generator. It then flows through the holes in the hoop section adjacent the rear end thereof, and impinges on the stator winding end-turns. Some of the air then passes forward between the inside of the hoop section and the external surface of the stator along the internal fins. An alternate flow path for some of the air once it has passed through the hoop section is to move forward through the gap between the rotor and the stator to thus cool the rotor hollow sleeve and permanent magnet shafts. The amount of air flowing over the rotor can be adjusted by modifying the size of the space between the internal fins. The air is finally drawn out by the fan and directed away from the engine inlet by suitable ductwork.

The high speed of the fan allows it to create large pressure heads and move large volumes of air. This produces high velocity flow in the heat-sink that in turn results in high heat transfer coefficients. Furthermore, the air, which impinges on the stator end-turns, is very effective at removing heat.

Having fins on both the outside and the inside of the hoop section allows large heat transfer areas to be obtained while using low fin aspect ratios. This low fin aspect ratio allows the heat sink to be extruded which makes its construction very cost effective. The invention has the following advantages:

The system of the invention is capable of removing a large amount of heat in a small volume, which in turn allows the generator to remain compact thereby reducing the amount of material and the cost of those materials used in the construction of the generator.

The generator rotor is directly cooled thereby improving the generator's efficiency by increasing the magnetic field strength of the shaft.

The system is very simple requiring no additional moving parts, control systems, or fluids.

Ducting the generator cooling air away from the engine inlet minimizes heating of the air entering the turbogenerator. This improves the net efficiency and increases the power of the turbogenerator system, even when the power consumption of the fan is accounted for.

BRIEF DESCRIPTION OF THE DRAWINGS

Having described the invention in general terms, reference will now be made to the accompanying drawings in which:

FIG. 2 is a block diagram schematic of a turbogenerator system including a power controller having decoupled rotor speed, operating temperature, and DC bus voltage control loops.

DETAILED DESCRIPTION
Mechanical Structural Embodiment of a Turbogenerator

Figure 1A:
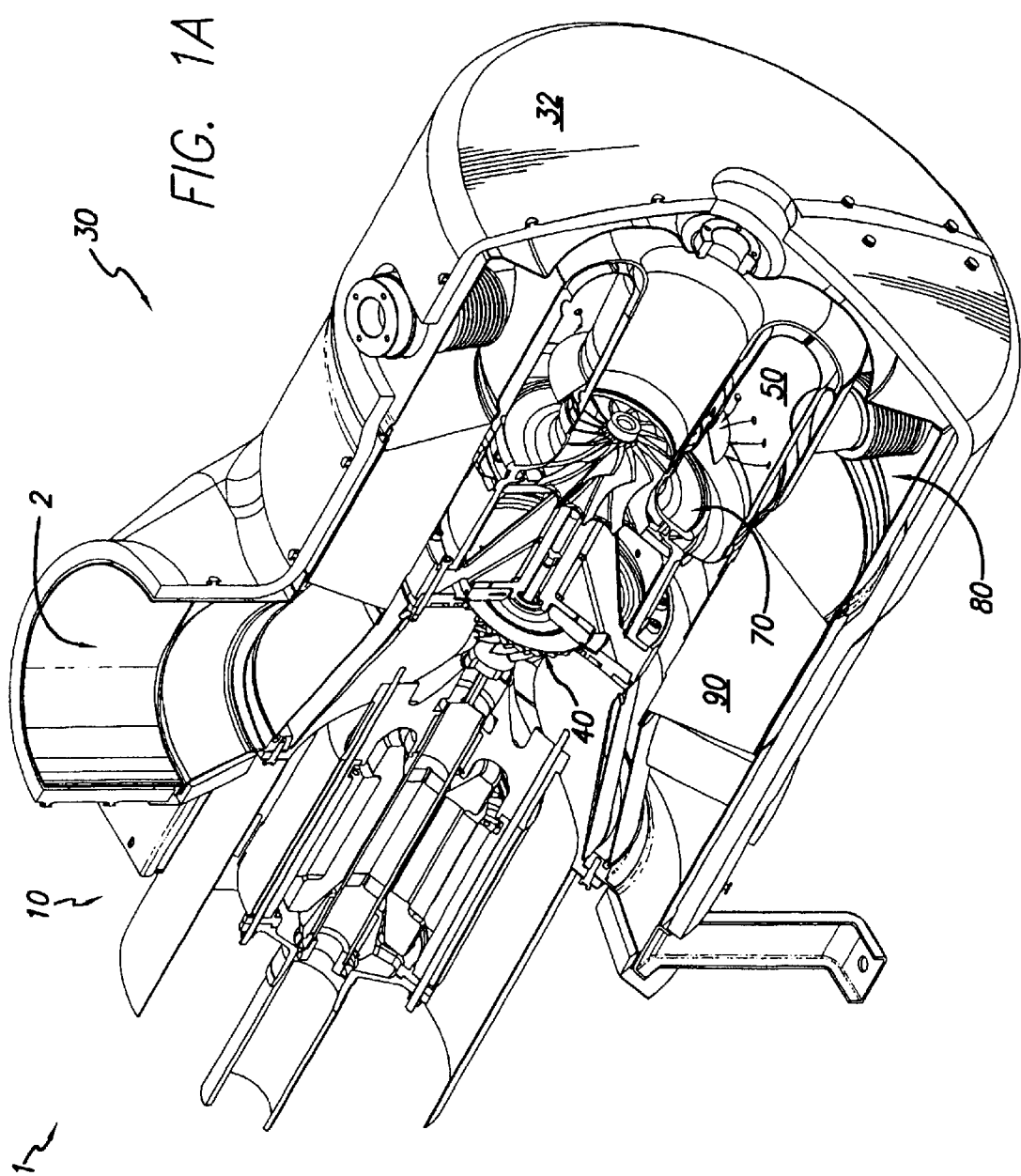
FIG. 1A is perspective view, partially in section, of an integrated turbogenerator system.

With reference to FIG. 1A, an integrated turbogenerator 1 according to the present invention generally includes motor/generator section 10 and compressor-combustor section 30. Compressor-combustor section 30 includes exterior can 32, compressor 40, combustor 50 and turbine 70. A recuperator 90 may be optionally included.

Figure 1B:
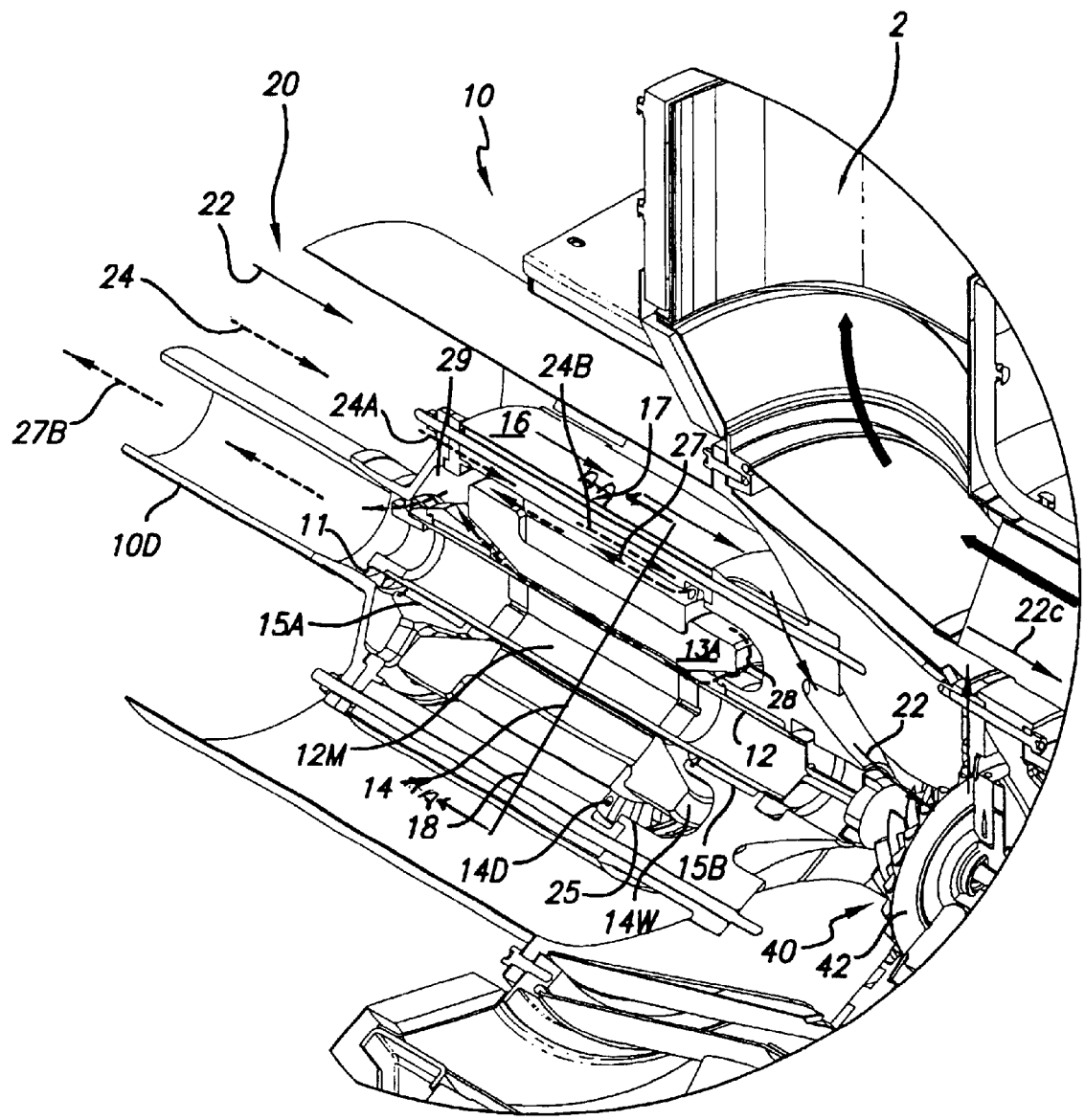
FIG. 1B is a magnified perspective view, partially in section, of the motor/generator portion of the integrated turbogenerator of FIG. 1A.
Figure 1C:
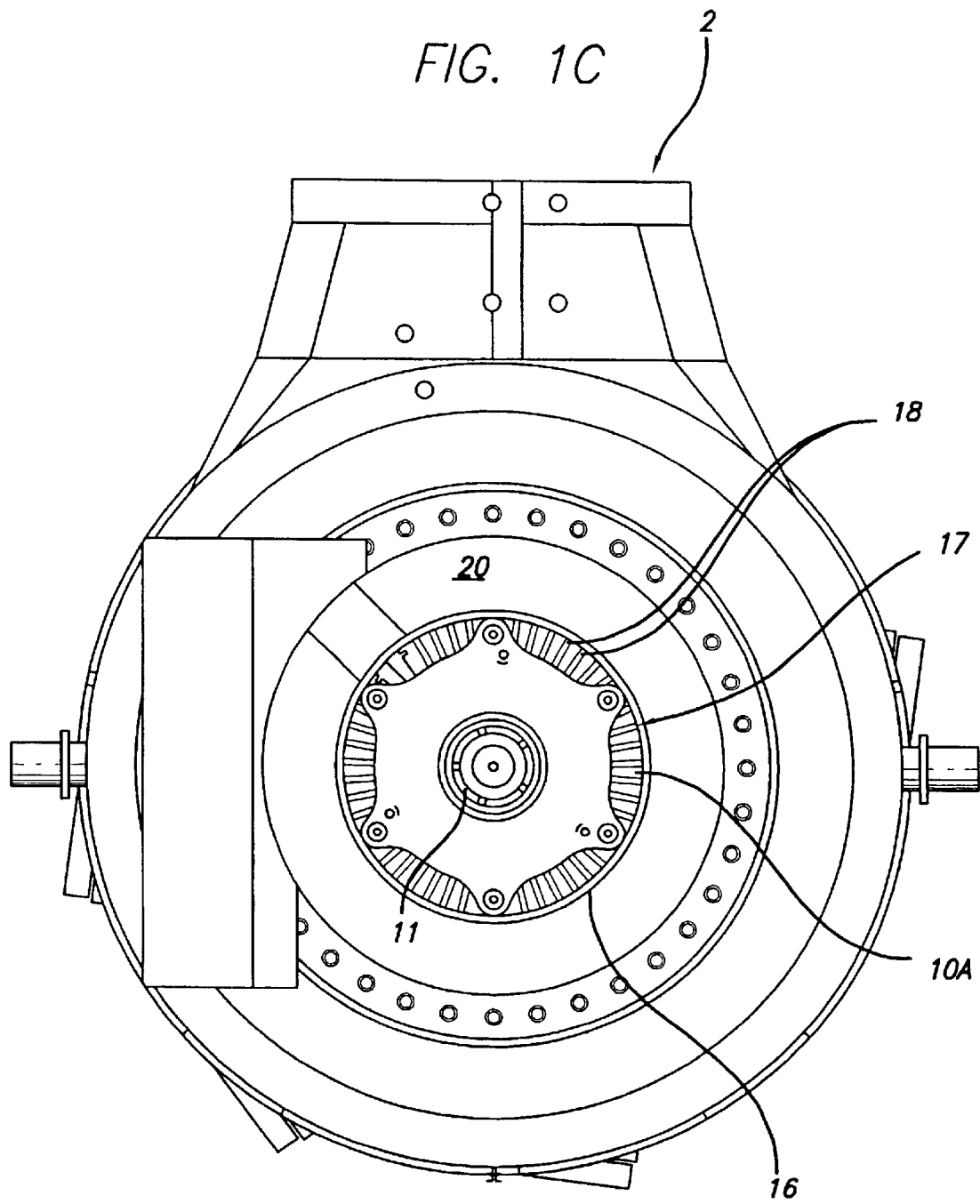
FIG. 1C is an end view, from the motor/generator end, of the integrated turbogenerator of FIG. 1A.

Referring now to FIG. 1B and FIG. 1C, in a currently preferred embodiment of the present invention, motor/generator section 10 may be a permanent magnet motor generator having a permanent magnet rotor or sleeve 12. Any other suitable type of motor generator may also be used. Permanent magnet rotor or sleeve 12 may contain a permanent magnet 12M. Permanent magnet rotor or sleeve 12 and the permanent magnet disposed therein are rotatably supported within permanent magnet motor/generator stator 14. Preferably, one or more compliant foil, fluid film, radial, or journal bearings 15A and 15B rotatably support permanent magnet rotor or sleeve 12 and the permanent magnet disposed therein. All bearings, thrust, radial or journal bearings, in turbogenerator 1 may be fluid film bearings or compliant foil bearings. Motor/generator housing 16 encloses stator heat exchanger 17 having a plurality of radially extending stator cooling fins 18. Stator cooling fins 18 connect to or form part of stator 14 and extend into annular space 10A between motor/generator housing 16 and stator 14. Wire windings 14W exist on permanent magnet motor/generator stator 14.

Figure 1D:
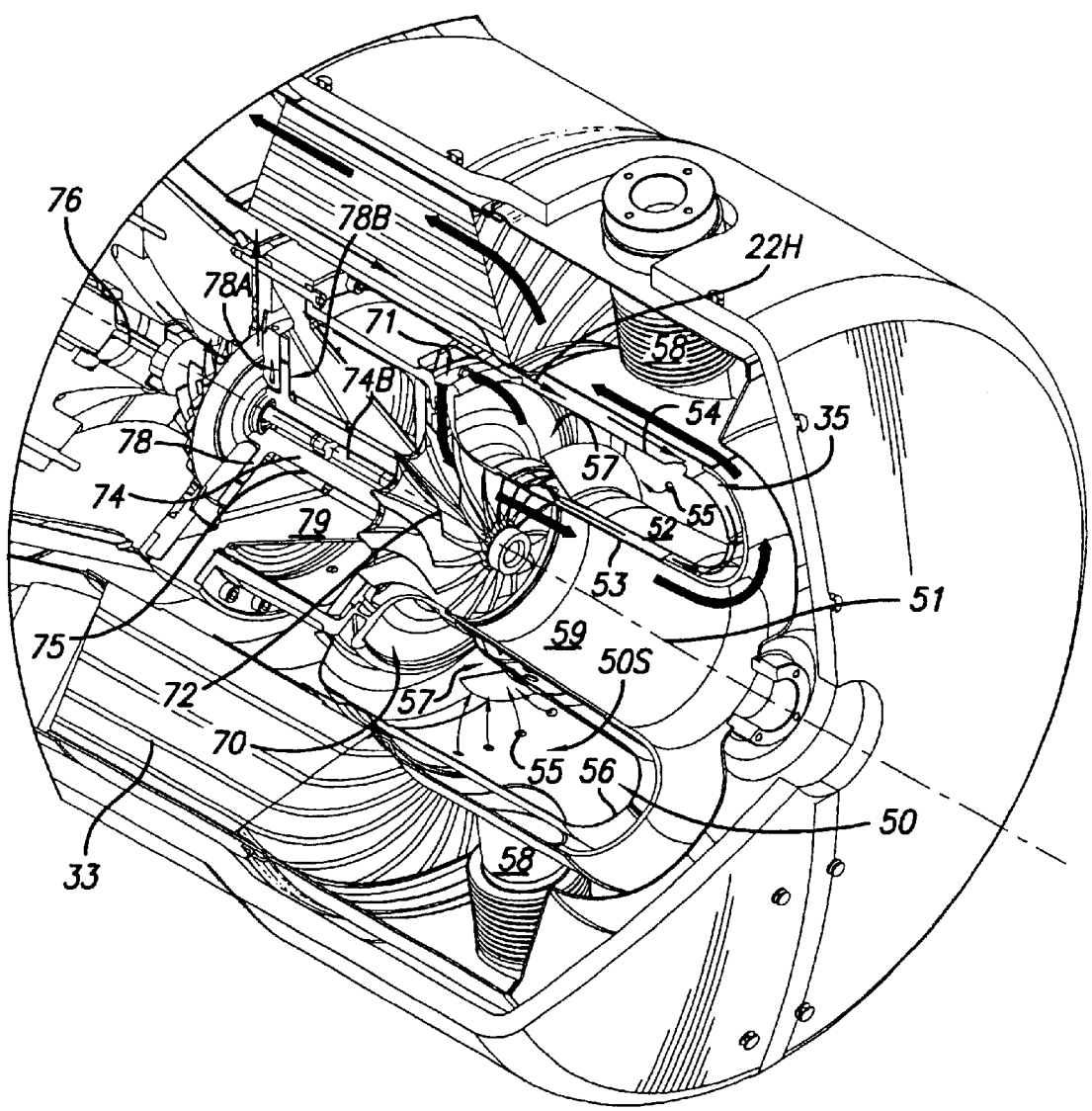
FIG. 1D is a magnified perspective view, partially in section, of the combustor-turbine exhaust portion of the integrated turbogenerator of FIG. 1A.

Referring now to FIG. 1D, combustor 50 may include cylindrical inner wall 52 and cylindrical outer wall 54. Cylindrical outer wall 54 may also include air inlets 55. Cylindrical walls 52 and 54 define an annular interior space 50S in combustor 50 defining an axis 51. Combustor 50 includes a generally annular wall 56 further defining one axial end of the annular interior space of combustor 50. Associated with combustor 50 may be one or more fuel injector inlets 58 to accommodate fuel injectors which receive fuel from fuel control element 50P as shown in FIG. 2, and inject fuel or a fuel air mixture to interior of 50S combustor 50. Inner cylindrical surface 53 is interior to cylindrical inner wall 52 and forms exhaust duct 59 for turbine 70.

Turbine 70 may include turbine wheel 72. An end of combustor 50 opposite annular wall 56 further defines an aperture 71 in turbine 70 exposed to turbine wheel 72. Bearing rotor 74 may include a radially extending thrust bearing portion, bearing rotor thrust disk 78, constrained by bilateral thrust bearings 78A and 78B. Bearing rotor 74 may be rotatably supported by one or more journal bearings 75 within center bearing housing 79. Bearing rotor thrust disk 78 at the compressor end of bearing rotor 76 is rotatably supported preferably by a bilateral thrust bearing 78A and 78B. Journal or radial bearing 75 and thrust bearings 78A and 78B may be fluid film or foil bearings.

Turbine wheel 72, Bearing rotor 74 and Compressor impeller 42 may be mechanically constrained by tie bolt 74B, or other suitable technique, to rotate when turbine wheel 72 rotates. Mechanical link 76 mechanically constrains compressor impeller 42 to permanent magnet rotor or sleeve 12 and the permanent magnet disposed therein causing permanent magnet rotor or sleeve 12 and the permanent magnet disposed therein to rotate when compressor impeller 42 rotates.

Figure 1E:
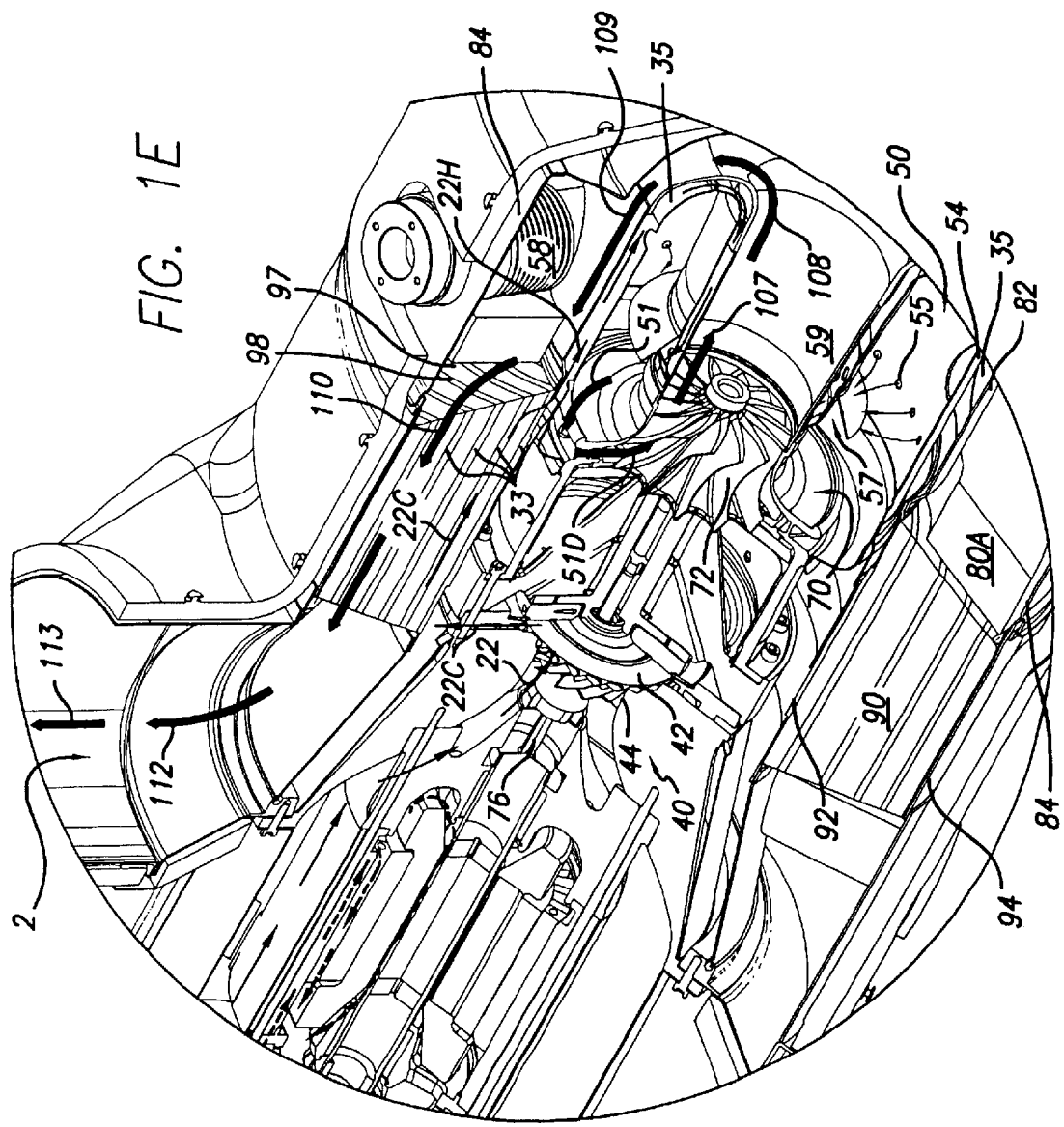
FIG. 1E is a magnified perspective view, partially in section, of the compressor-turbine portion of the integrated turbogenerator of FIG. 1A.

Referring now to FIG. 1E, compressor 40 may include compressor impeller 42 and compressor impeller housing 44. Recuperator 90 may have an annular shape defined by cylindrical recuperator inner wall 92 and cylindrical recuperator outer wall 94. Recuperator 90 contains internal passages for gas flow, one set of passages, passages 33 connecting from compressor 40 to combustor 50, and one set of passages, passages 97, connecting from turbine exhaust 80 to turbogenerator exhaust output 2.

Referring again to FIG. 1B and FIG. 1C, in operation, air flows into primary inlet 20 and divides into compressor air 22 and motor/generator cooling air 24. Motor/generator cooling air 24 flows into annular space 10A between motor/generator housing 16 and permanent magnet motor/generator stator 14 along flow path 24A. Heat is exchanged from stator cooling fins 18 to generator cooling air 24 in flow path 24A, thereby cooling stator cooling fins 18 and stator 14 and forming heated air 24B. Warm stator cooling air 24B exits stator heat exchanger 17 into stator cavity 25 where it further divides into stator return cooling air 27 and rotor cooling air 28. Rotor cooling air 28 passes around stator end 13A and travels along rotor or sleeve 12. Stator return cooling air 27 enters one or more cooling ducts 14D and is conducted through stator 14 to provide further cooling. Stator return cooling air 27 and rotor cooling air 28 rejoin in stator cavity 29 and are drawn out of the motor/generator 10 by exhaust fan 11 which is connected to rotor or sleeve 12 and rotates with rotor or sleeve 12. Exhaust air 27B is conducted away from primary air inlet 20 by duct 10D.

Referring again to FIG. 1E, compressor 40 receives compressor air 22. Compressor impeller 42 compresses compressor air 22 and forces compressed gas 22C to flow into a set of passages 33 in recuperator 90 connecting compressor 40 to combustor 50. In passages 33 in recuperator 90, heat is exchanged from walls 98 of recuperator 90 to compressed gas 22C. As shown in FIG. 1E, heated compressed gas 22H flows out of recuperator 90 to space 35 between cylindrical inner surface 82 of turbine exhaust 80 and cylindrical outer wall 54 of combustor 50. Heated compressed gas 22H may flow into combustor 54 through sidewall ports 55 or main inlet 57. Fuel (not shown) may be reacted in combustor 50, converting chemically stored energy to heat. Hot compressed gas 51 in combustor 50 flows through turbine 70 forcing turbine wheel 72 to rotate. Movement of surfaces of turbine wheel 72 away from gas molecules partially cools and decompresses gas 51D moving through turbine 70. Turbine 70 is designed so that exhaust gas 107 flowing from combustor 50 through turbine 70 enters cylindrical passage 59. Partially cooled and decompressed gas in cylindrical passage 59 flows axially in a direction away from permanent magnet motor/generator section 10, and then radially outward, and then axially in a direction toward permanent magnet motor/generator section 10 to passages 98 of recuperator 90, as indicated by gas flow arrows 108 and 109 respectively.

In an alternate embodiment of the present invention, low pressure catalytic reactor 80A may be included between fuel injector inlets 58 and recuperator 90. Low pressure catalytic reactor 80A may include internal surfaces (not shown) having catalytic material (e.g., Pd or Pt, not shown) disposed on them. Low pressure catalytic reactor 80A may have a generally annular shape defined by cylindrical inner surface 82 and cylindrical low pressure outer surface 84. Unreacted and incompletely reacted hydrocarbons in gas in low pressure catalytic reactor 80A react to convert chemically stored energy into additional heat, and to lower concentrations of partial reaction products, such as harmful emissions including nitrous oxides (NOx).

Gas 110 flows through passages 97 in recuperator 90 connecting from turbine exhaust 80 or catalytic reactor 80A to turbogenerator exhaust output 2, as indicated by gas flow arrow 112, and then exhausts from turbogenerator 1, as indicated by gas flow arrow 113. Gas flowing through passages 97 in recuperator 90 connecting from turbine exhaust 80 to outside of turbogenerator 1 exchanges heat to walls 98 of recuperator 90. Walls 98 of recuperator 90 heated by gas flowing from turbine exhaust 80 exchange heat to gas 22C flowing in recuperator 90 from compressor 40 to combustor 50.

Turbogenerator 1 may also include various electrical sensor and control lines for providing feedback to power controller 201 and for receiving and implementing control signals as shown in FIG. 2.

Alternative Mechanical Structural Embodiments of the Integrated Turbogenerator

The integrated turbogenerator disclosed above is exemplary. Several alternative structural embodiments are known.

In one alternative embodiment, air 22 may be replaced by a gaseous fuel mixture. In this embodiment, fuel injectors may not be necessary. This embodiment may include an air and fuel mixer upstream of compressor 40.

In another alternative embodiment, fuel may be conducted directly to compressor 40, for example by a fuel conduit connecting to compressor impeller housing 44. Fuel and air may be mixed by action of the compressor impeller 42. In this embodiment, fuel injectors may not be necessary.

In another alternative embodiment, combustor 50 may be a catalytic combustor.

In another alternative embodiment, geometric relationships and structures of components may differ from those shown in FIG. 1A. Permanent magnet motor/generator section 10 and compressor/combustor section 30 may have low pressure catalytic reactor 80A outside of annular recuperator 90, and may have recuperator 90 outside of low pressure catalytic reactor 80A. Low pressure catalytic reactor 80A may be disposed at least partially in cylindrical passage 59, or in a passage of any shape confined by an inner wall of combustor 50. Combustor 50 and low pressure catalytic reactor 80A may be substantially or completely enclosed with an interior space formed by a generally annularly shaped recuperator 90, or a recuperator 90 shaped to substantially enclose both combustor 50 and low pressure catalytic reactor 80A on all but one face.

Alternative Use of the Invention Other than in Integrated Turbogenerators

An integrated turbogenerator is a turbogenerator in which the turbine, compressor, and generator are all constrained to rotate based upon rotation of the shaft to which the turbine is connected. The invention disclosed herein is preferably but not necessarily used in connection with a turbogenerator, and preferably but not necessarily used in connection with an integrated turbogenerator.

Turbogenerator System Including Controls

Referring now to FIG. 2, a preferred embodiment is shown in which a turbogenerator system 200 includes power controller 201 which has three substantially decoupled control loops for controlling (1) rotary speed, (2) temperature, and (3) DC bus voltage. A more detailed description of an appropriate power controller is disclosed in U.S. patent application Ser. No. 09/207,817, filed Dec. 8, 1998 in the names of Gilbreth, Wacknov and Wall, and assigned to the assignee of the present application which is incorporated herein in its entirety by this reference.

Referring still to FIG. 2, turbogenerator system 200 includes integrated turbogenerator 1 and power controller 201. Power controller 201 includes three decoupled or independent control loops.

A first control loop, temperature control loop 228, regulates a temperature related to the desired operating temperature of primary combustor 50 to a set point, by varying fuel flow from fuel control element 50P to primary combustor 50. Temperature controller 228C receives a temperature set point, T*, from temperature set point source 232, and receives a measured temperature from temperature sensor 226S connected to measured temperature line 226. Temperature controller 228C generates and transmits over fuel control signal line 230 to fuel pump 50P a fuel control signal for controlling the amount of fuel supplied by fuel pump 50P to primary combustor 50 to an amount intended to result in a desired operating temperature in primary combustor 50. Temperature sensor 226S may directly measure the temperature in primary combustor 50 or may measure a temperature of an element or area from which the temperature in the primary combustor 50 may be inferred.

A second control loop, speed control loop 216, controls speed of the shaft common to the turbine 70, compressor 40, and motor/generator 10, hereafter referred to as the common shaft, by varying torque applied by the motor generator to the common shaft. Torque applied by the motor generator to the common shaft depends upon power or current drawn from or pumped into windings of motor/generator 10. Bi-directional generator power converter 202 is controlled by rotor speed controller 216C to transmit power or current in or out of motor/generator 10, as indicated by bidirectional arrow 242. A sensor in turbogenerator 1 senses the rotary speed on the common shaft and transmits that rotary speed signal over measured speed line 220. Rotor speed controller 216 receives the rotary speed signal from measured speed line 220 and a rotary speed set point signal from a rotary speed set point source 218. Rotary speed controller 216C generates and transmits to generator power converter 202 a power conversion control signal on line 222 controlling generator power converter 202's transfer of power or current between AC lines 203 (i.e., from motor/generator 10) and DC bus 204. Rotary speed set point source 218 may convert to the rotary speed set point a power set point P* received from power set point source 224.

A third control loop, voltage control loop 234, controls bus voltage on DC bus 204 to a set point by transferring power or voltage between DC bus 204 and any of (1) Load/Grid 208 and/or (2) energy storage device 210, and/or (3) by transferring power or voltage from DC bus 204 to dynamic brake resistor 214. A sensor measures voltage DC bus 204 and transmits a measured voltage signal over measured voltage line 236. Bus voltage controller 234C receives the measured voltage signal from voltage line 236 and a voltage set point signal V* from voltage set point source 238. Bus voltage controller 234C generates and transmits signals to bidirectional load power converter 206 and bi-directional battery power converter 212 controlling their transmission of power or voltage between DC bus 204, load/grid 208, and energy storage device 210, respectively. In addition, bus voltage controller 234 transmits a control signal to control connection of dynamic brake resistor 214 to DC bus 204.

Power controller 201 regulates temperature to a set point by varying fuel flow, adds or removes power or current to motor/generator 10 under control of generator power converter 202 to control rotor speed to a set point as indicated by bi-directional arrow 242, and controls bus voltage to a set point by (1) applying or removing power from DC bus 204 under the control of load power converter 206 as indicated by bi-directional arrow 244, (2) applying or removing power from energy storage device 210 under the control of battery power converter 212, and (3) by removing power from DC bus 204 by modulating the connection of dynamic brake resistor 214 to DC bus 204.

Figure 3:
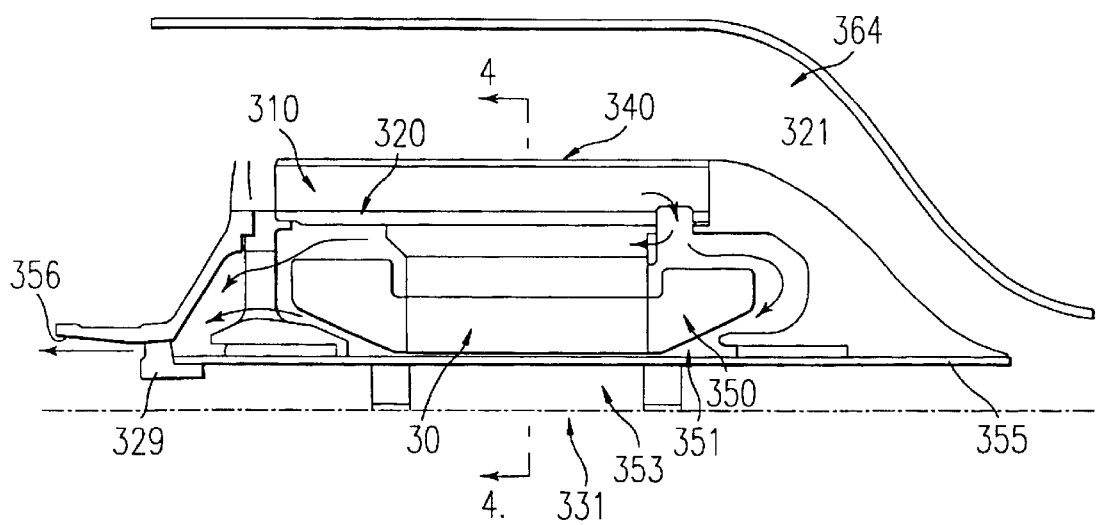
FIG. 3 is a vertical section of a turbogenerator illustrating the path of travel of cooling air through the disclosed cooling system.
Figure 4A:
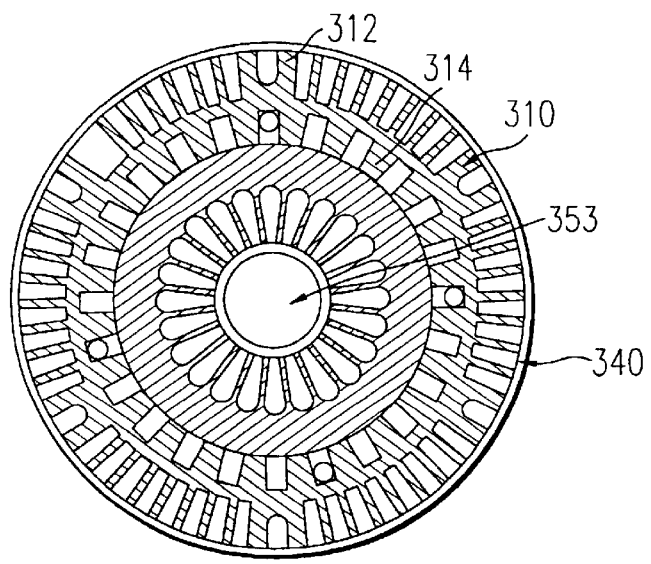
FIG. 4A is a sectional view along lines A—A of FIG. 1B.
Figure 4B:
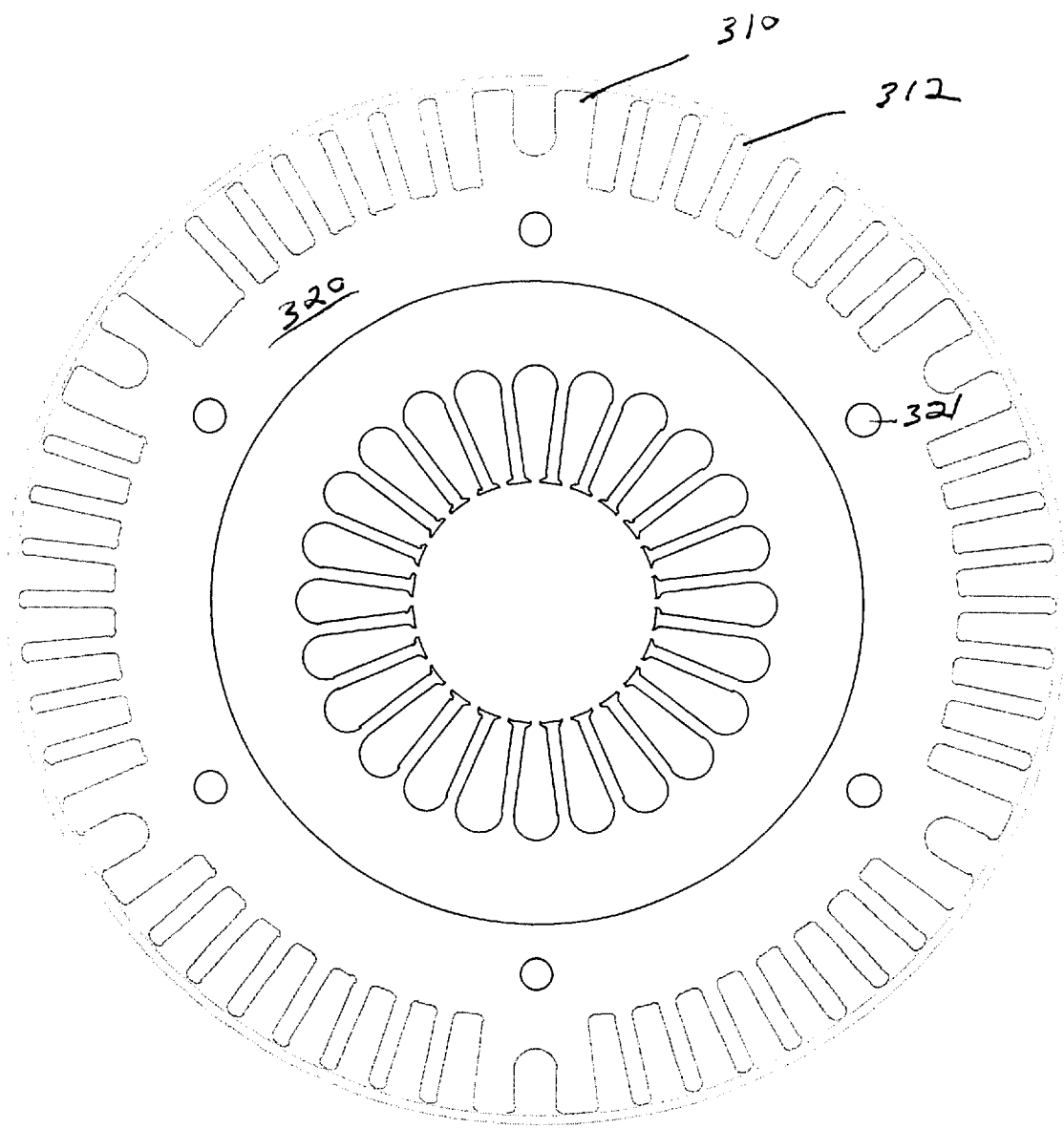
FIG. 4B is another embodiment of the invention shown in FIG. A.

In a first embodiment of the present invention, as shown in FIGS. 3, and 4A, a turbogenerator cooling system comprises cylindrical heat sink 310 with generally axially extending external fins 312 on the outside and internal fins 314 on the inside of hoop section 320. In another embodiment shown in FIG. 4B, hoop section 320 is solid except for holes 321 adjacent the rear end to allow cooling air to pass from the outside to the inside of hoop section 320. Generator stator 330 is press-fit into heat sink 310 with its external surface in contact with internal fins 314 in the FIG. 4A embodiment. In the FIG. 4B embodiment, the stator is press fit against the inside of solid hoop section 320. The entire assembly is surrounded by close-fitting cylindrical shroud 340. Generator rotor 331 is fitted with small fan 329. Heated air exiting fan 329 is directed away from the turbogenerator inlet be ducting. When the turbogenerator rotates, fan 329 draws air through the cooling paths and out the front of the generator. Air enters heat sink 310 at the front of the generator between hoop section 320 and shroud 340 and passes along external fins 312 to the rear of the generator. The air then flows through holes 321 in hoop section 320, impinges on stator winding endturns 350 before passing forward between hoop section 320 and the external surface of stator 330 along internal fins 314 on the inside of hoop section 320. An alternate flow path for the air once it has passed through holes 321 in hoop section 320 is to move forward through gap 351 between hollow sleeve shaft 355 and the stator 330 thus cooling permanent magnet rotor shaft 353 press-fit within hollow sleeve shaft 355. The amount of air flowing over hollow sleeve shaft 355 can be adjusted by modifying the size of the space between internal fins 314. The air finally is drawn out by fan 329 on shaft 355 and directed away from the turbogenerator inlet by ducting. The fan outlet includes conical diffuser 356 with straightening vanes (not shown). Diffuser 356 is used for head recovery.

The high speed of fan 329 allows it to create large pressure heads and move large volumes of air. Thus, the fan 329 produces high velocity flow in heat sink 310 that in turn results in high heat transfer coefficients. Furthermore, the air, which impinges on stator endturns 350, is very effective at removing heat. Having both external fins 312 and internal fins 314 on the hoop section allows large heat transfer areas to be obtained while using low fin aspect ratios. This low fin aspect ratio allows heat sink 310 to be extruded, which makes its construction very cost effective.

Because the cooling system of the invention is capable of removing a large amount of heat in a small volume, the generator is allowed to remain compact thereby reducing the amount and the cost of material used in constructing the generator.

Hollow rotor sleeve shaft 355 and permanent magnet shaft 353 press-fit therein are directly cooled thereby improving the generator's efficiency by increasing the magnetic field strength of the rotor. The system is very simple and requires no additional moving parts, control systems, or fluids. Ducting the generator cooling air away from the turbogenerator inlet minimizes heating of the air entering the engine. By minimizing the heated air entering the engine, the net efficiency of the engine improves and the power output of the turbogenerator system is increased, even when the power consumption of fan 329 is accounted for.

FIG. 1B illustrates the present invention in combination with compressor 40 and other engine components. Arrow 24 illustrates the cooling air entering the heat sink 310 (FIG. 3) and the arrow 27B illustrates the cooling air leaving the heat sink 310 and directed away from the compressor 40. Arrow 22 illustrates combustion air entering the engine and directed toward the compressor 40. Thus, heated cooling air 27B is directed away from the engine inlet and the combustion air 22 is directed toward the engine inlet.

While the present invention has been described with reference to a preferred embodiment, workers skilled in the art will recognize that changes may be made in form and detail without departing from the spirit and scope of the invention. All such changes, modifications, variations and other uses and applications which do not depart from the spirit and scope of the invention are deemed to be covered by the invention which is limited only by the claims which follow.

What I claim is:

1. A turbogenerator cooling system, comprising:
   (a) a turbogenerator inlet;
   (b) a hood section having a front end, a rear end adjacent said turbogenerator inlet, a substantially cylindrical outer surface extending from said front end to said rear end, a substantially cylindrical inner surface extending from said front end to said rear end, and holes adjacent said rear end extending through said hood section;
   (b) external fins extending generally axially from front to rear along said outer cylindrical surface of said hood section;
   (c) a shroud enclosing said hood section and said external fins;
   (d) internal fins extending generally from front to rear along said inner cylindrical surface of said hood section;
   (e) a stator press-fit within said hood section in contact with said internal fins;
   (f) a permanent magnet rotor shaft rotatably mounted within said stator; and
   (g) a fan mounted on said permanent magnet rotor shaft for rotation therewith arranged to draw cooling air (1) rearwardly along said external fins between said hood section and said shroud, (2) inwardly through said holes adjacent the rear end of said hood section, and (3) forwardly away from said turbogenerator inlet along said internal fins between said hood section and said stator.

2. A turbogenerator cooling system according to claim 1, further comprising:
   (a) a stator inner surface on said stator surrounding said permanent magnetic rotor shaft, said stator inner surface being slightly spaced from said permanent magnetic rotor shaft to provide a gap therebetween;
   (b) wherein said fan draws cooling air through said gap along said permanent magnetic rotor shaft.

3. A turbogenerator cooling system according to according to claim 1, further comprising:
   (a) stator winding end-turns on said stator between said internal fins and said permanent magnetic rotor shaft; and
   (b) wherein said fan draws cooling air over said stator winding end-turns.

4. A turbogenerator cooling system according to claim 2, further comprising:
   (a) front stator winding end-turns and rear stator winding end-turns on said stator between said internal fins and said permanent magnetic rotor shaft; and
   (b) wherein said fan draws cooling air (1) along said internal fins and over said front stator winding end-turns and (2) over said rear stator winding end-turns and through said gap.

5. A turbogenerator cooling system according to claim 1, further comprising:
   (a) an outlet on said fan directed away from said engine inlet; and
   (b) a diffuser surrounding said fan outlet.

6. A turbogenerator cooling system according to claim 5, wherein said diffuser includes straightening vanes.

* * * * *